United States Patent [19]

Schroeder

[11] 4,221,818

[45] Sep. 9, 1980

[54] ANIMAL FEED SUPPLEMENT IN BLOCK FORM WITH REDUCED CONSUMPTION RATE

[76] Inventor: Jack J. Schroeder, #4 N. Quail Ridge Rd., Rolling Hills, Calif. 90274

[21] Appl. No.: 938,632

[22] Filed: Aug. 31, 1978

[51] Int. Cl.² ............................................... A23K 1/02
[52] U.S. Cl. ................................... 426/138; 426/515; 426/623; 426/630; 426/635; 426/658; 426/807
[58] Field of Search ............... 426/807, 623, 138, 119, 426/120, 125, 635, 658, 108, 512, 515, 630; 249/129–132; 229/15, 42; 424/14; 127/49

[56] References Cited

U.S. PATENT DOCUMENTS

| | | | |
|---|---|---|---|
| 2,888,186 | 5/1959 | Meyers | 229/42 |
| 3,749,299 | 7/1973 | Ingle | 229/15 |
| 3,961,081 | 6/1976 | McKenzie | 426/515 X |
| 4,016,296 | 4/1977 | Desantis | 426/658 X |
| 4,027,043 | 5/1977 | Schroeder et al. | 426/658 X |
| 4,052,034 | 10/1977 | Marceno | 249/130 X |
| 4,061,728 | 12/1977 | Graham et al. | 424/14 |
| 4,062,988 | 12/1977 | Desantis | 426/807 X |
| 4,094,454 | 6/1978 | Snyder | 229/15 |

*Primary Examiner*—R. B. Penland
*Attorney, Agent, or Firm*—Robert E. Strauss

[57] ABSTRACT

There is disclosed a solid animal feed supplement block packaged in block form with structural members that subdivide the block. The block has a reduced consumption rate that results from the structural members within the block. The preferred members comprise partitions formed of corregated cardboard which subdivide the block into a plurality of cells. The animal feed supplement can contain a drug and the partitions can provide a convenient measure of the drug dosage, preferably by providing a plurality of solid blocks or cubes each of which provides a premeasured dosage, e.g., a daily dosage for a single animal.

10 Claims, 7 Drawing Figures

ANIMAL FEED SUPPLEMENT IN BLOCK FORM WITH REDUCED CONSUMPTION RATE

BACKGROUND OF THE INVENTION

1. Field of Invention

This invention relates to animal feed supplements, and in particular, to a block form of the supplment intended for free choice feeding.

2. Brief Statement of the Prior Art

Sugar-base animal feed supplements such as the typical molasses-urea compositions have been used for many years in liquid form. The supplement is added daily to the forage and feed for the animal. These supplements have also been provided for animals in a free choice feeding by the use of "lick wheels" in which the animal obtains the supplement by licking the supplement from the paddles of a wheel which is rotated through a reservoir of the supplement.

Medications and drugs have been included with animal feed supplements and have been forcibly administered to animals in controlled dosage. These methods, however, are costly, often requiring extensive time and attention of skilled personnel such as veterinarians and their assistants.

One of the problems which attends any free choice feeding of the sugar base solutions is over-consumption by the cattle, and this problem is particularly acute when a medication or drug is to be included with the supplement. The aforementioned lick wheels limit overconsumption somewhat by physically limiting the supply to the cattle. The consumption can also be controlled when a liquid supplement is added in regulated amounts to the normal daily diet of the animal, however, this incurs high labor costs and handling problems.

The high cost of dispensing liquid supplements has spurred recent attempts to provide the supplement in a solid block form for free choice feeding by the cattle. A number of recently issued patents have been directed to animal feed blocks of this nature, e.g., see U.S. Pat. Nos. 4,027,043, 4,016,296 and 3,961,081. Typically, these blocks are solidified by the addition of calcium oxide and phosphoric acid to the supplement to form a solid block; by the addition of calcium oxide and fatty acids to form a soap gel; or by crystallization of the sugars; as in candy manufacture.

It has been proposed that overconsumption of these blocks can be avoided and free choice feeding in controlled quantities can be accomplished by the incorporation of various appetite inhibitors. While some reduction in consumption can be achieved with appetite inhibitors, these inhibitors are adulterants and potential food additives, the effects of which are never completely identifiable. The materials also contribute to an increased cost of maufacturing the block. The inhibitors also do not provide a control over consumption with the precision or exactitude necessary for controlled dosages of medication.

BRIEF STATEMENT OF THE INVENTION

This invention comprises an animal feed supplement in block form packaged with a plurality of structural members that subdivide the block and thus physically interfere with the feeding by the animal, thereby reducing the consumption of the supplement. The preferred structural members comprise a plurality of vertical partitions preferably of animal-edible material, e.g., vertical cardboard partitions which subdivide the block into a plurality of vertical cells. These partitions are readily available since the block is customarily poured into a cardboard container during its formation and the carton manufacturers have cardboard partitions available in any of a plurality of sizes permitting the block manufacturer to vary the number of partitions to fit the particular requirements for daily consumption by cattle. The partitions also prevent cattle from forming a central depression in the top of the blocks which permits the cattle to break chunks from the side of the block. In one application, the size and spacing of the partitions is selected to permit the user to obtain small block segments or cubes suitable to supply an animal's daily requirements. This is particularly useful when drugs are to be administered since the smaller block segments provide a precise control for the medication and the pleasing palatability of the supplement insures ingestion without forced feeding.

BRIEF DESCRIPTION OF THE DRAWINGS

The invention will be described by reference to the FIGURES, of which.

DESCRIPTION OF PREFERRED EMBODIMENTS

This invention comprises an animal feed supplement in block form. The supplement comprises a composition of a sugar solution and a solidifying component together with optional amounts of animal nutrients such as natural protein or, when intended for ruminant feeding, a nitrogenous compound convertible by the ruminant to protein such as urea or an ammonium salt. The solidifying reaction for the block can comprise the crystallization of the sugars effected by evaporation of the solution and carmelization, similar to the procedure of candy making. Preferably, however, the block is solidified by the incorporation of solidification additives and, most preferably, is formed by the addition of a calcium oxide and phosphoric acid to the supplement.

The supplement can also be solidified in block form by the formation therein of an insoluble calcium soap of feed grade fatty acids by the addition of calcium oxide and free fatty acids under soap-forming conditions. Another method comprises the addition of a large quantity of magnesium oxide to a molasses supplement.

Regardless of the particular solidification method employed, the feed supplement during the manufacturing process is a liquid which can be poured into the cardboard cartons and a plurality of vertical cardboard partitions in a predetermined spacing can be incorporated in the cartons to provide the desired daily consumption rate.

Although the vertical cardboard partitions which subdivide the carton into a plurality of vertical cells are the preferred structural members, it is apparent that other structural fillers can likewise be employed provided these fillers extend throughout the exposed or licking surface of the block with a sufficient density to physically interfere with the licking by the animal.

Figure 1:
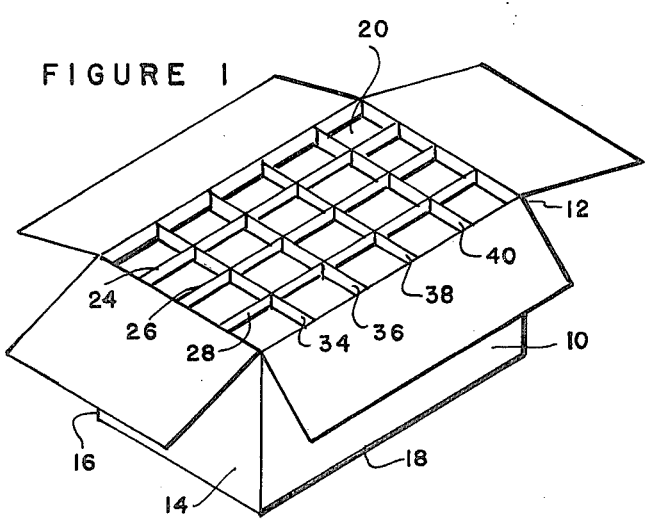
FIG. 1 illustrates a package of the invention.

Referring now to FIG. 1, the preferred embodiment of the block form animal feed supplement will be described. As there illustrated, the supplement is contained within a cardboard carton that is of a totally animal edible construction. The carton sidewalls 10, 12, 14 and 16, as well as the bottom 18 are formed of corregated cardboard and secured together by interlocking tabs and/or adhesives such as hot melt adhesives or waxes which are generally recognized as safe and fit for animal consumption. Disposed within the block 20 contained within the carton are a plurality of longitudinal cardboard partitions 24, 26 and 28 which intersect a second plurality of transverse parallel partitions 34, 36, 38 and 40. These partitions are of conventional construction, also formed of corregated cardboard, and the like and are entirely safe for consumption by cattle. In the manufacture, the partition insert, which is available in preassembled form from the carton manufacturer, is placed within the carton with the supplement in liquid form, which is poured into the carton. The steps of the manufacture are illustrated in FIGS. 3, 4 and 5.

Figure 2:
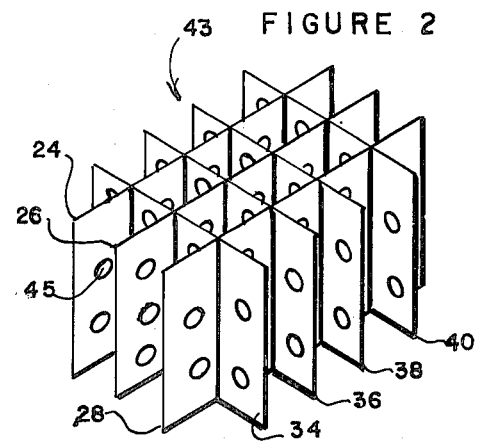
FIG. 2 illustrates a preferred structural member.

Referring now to FIG. 2, the preferred insert 43 of the partitions for free choice feeding comprises the aforementioned longitudinal partitions 24, 26 and 28 and transverse partitions 34, 36, 38 and 40. The preferred insert 43 has a plurality of apertures 45 in the partition walls so that the supplement bridges between the partitions. This prevents the animals from breaking smaller cubes or blocks from the larger block, preventing waste and overconsumption.

Figure 3:
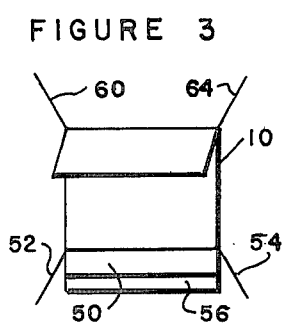
FIGS. 3–5 illustrate a method of packaging.

The carton is assembled as shown in FIG. 3 by closing and interengaging the bottom flaps 50, 52, 54 and 56. Preferably, the carton has interlocking tabs (not shown) which secure the assembly, however, an animal-edible adhesive such as a hot melt or wax can also be used.

Figure 4:
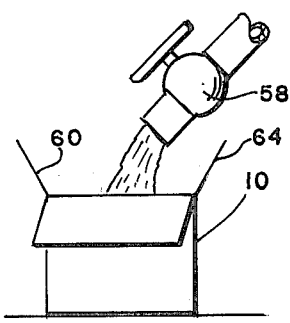
Figure 5:
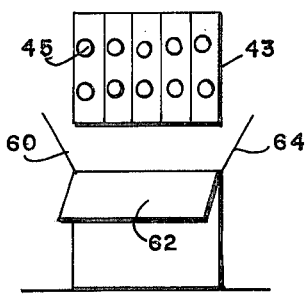

Referring now to FIG. 4, the supplement in liquid form is poured into the carton from a process line 58, filling the carton to the desired level. Thereafter, the assembled partitions 43, shown in FIG. 2 is inserted, forming a plurality of vertical cells within the carton. After filling, the cartons are closed by folding over the top flaps 60, 62, and 64 which are secured by interlocking tabs and/or a suitable adhesive. The sealed cartons are then stored to permit the supplement to solidify, a reaction which occurs within a short period of time, e.g., a few hours. Thereafter, the cartons are ready for use by removing the top to expose the upper surface for access for the animal.

Figure 6:
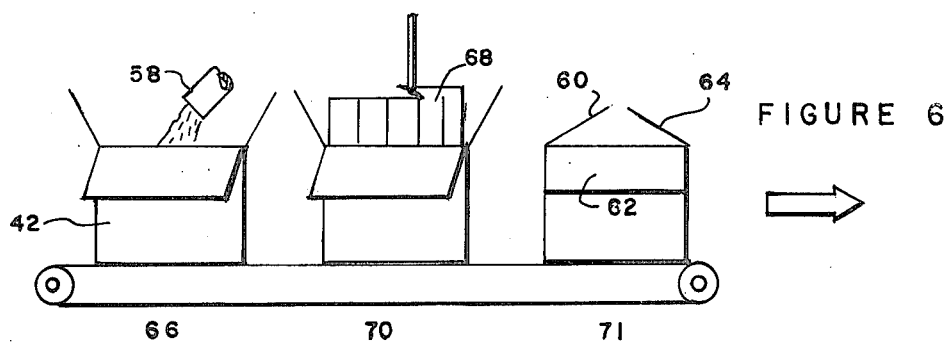
FIGS. 6 and 7 illustrate an alternative packaging method.
Figure 7:
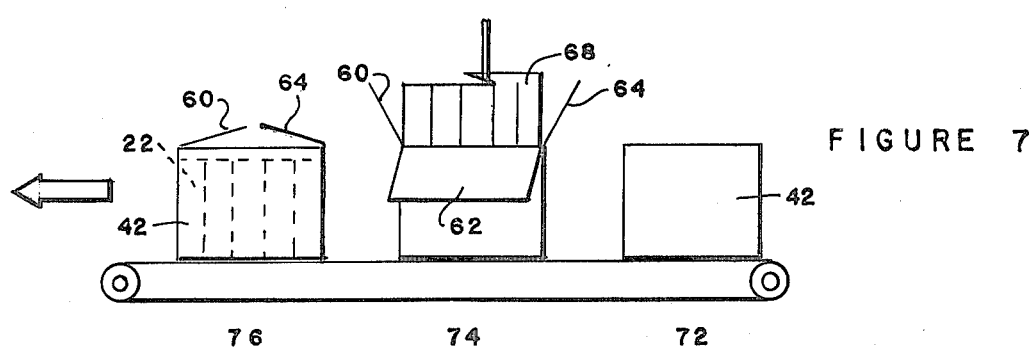

An alternative packaging method is shown in FIGS. 6 and 7. In this method, the carton 42 is filled at station 66 from process line 58 and a partition form 68 is inserted at station 70. The partition form 68 has a coating of a parting agent such as petroleum wax, Teflon, and the like. Alternatively, the partition form is constructed of rigid plastic sheets, e.g., of Teflon sheets. After insertion of the partition form 68, the top flaps 60, 62 and 64 are closed at station 71. The package is then stored for a sufficient time, e.g., from 3 to about 24 hours or longer, to permit the supplement to solidify into a hard, non-tacky solid state.

As shown in FIG. 7, the packages are removed from storage, opened at station 72 and the partition form 68 is removed therefrom at station 74. The cartons are then closed and sealed at station 76. The resultant package is a carton which contains a plurality of vertical blocks 22, extending substantially the height of the box.

Each of the vertical blocks 22 constitute a predetermined ration of supplement. Preferably, each is a daily ration for the animal so that the user need only add one block 58 to the animal's feed each day to provide a closely regulated diet. This packaging is particularly suited for medication purposes since predetermined amounts of drugs can be incorporated in the supplement during its manufacture and the animal will be given the precise daily dosages by the simple task of adding one block to the animal's daily ration.

The precise daily medication can also be achieved with a partition assembly 42 which remains in the carton. Preferably, the partition is of wax-coated cardboard construction and the user can thus readily remove individual blocks 58 from the carton.

The feed supplements which are used for practice of this invention in general have the composition set forth in the following table:

Table 1

| Ingredient | Proportions, Weight Percent | |
| --- | --- | --- |
| | Broad | Preferred |
| Sugar solution | 12–95 | 22–75 |
| Protein* | 0–40 | 20–40 |
| Fat | 0–25 | 3–15 |
| Minerals | 0–3 | 0.1–2 |
| Phosphorus | 1–5 | 1–3 |
| Calcium | 1–5 | 1–3 |

*Expressed as weight percent of equivalent protein.

The content of minerals, phosphorous and calcium, as well as other ingredients such as drugs, vitamins, etc., can be varied as desired for specific applications. Examples of various minerals are manganese, iodine, zinc, copper, cobalt and iron compounds. Examples of vitamins include Vitamin A, Vitamin D, and Vitamin E.

Examples of useful drugs are: growth promoting food additives or drugs such as monensin and sodium monensin, commercially available under the designation Rumensin from Eli Lilly Co.; diethylstilbestrol, chlorotetracyline and sulfamethazine; and mixtures of chlorotetracyline and sulfamethazine; etc. Other useful drugs include antibloat and antihelmintic agents as well as insert control agents. The aforementioned materials are used in effective concentrations for the desired result, e.g., drugs are used at concentrations from 0.5 to about 1.0 weight percent. The minerals are used in similar concentrations, but are often expressed in amounts from 3 to about 500 milligrams per pound and vitamins are frequently expressed from 10 to about 50,000 units per pound.

Sugar Solution

The feed supplement prepared by the method of this invention comprises an aqueous sugar solution as its continuous phase. The sugar solution can be employed in the feed supplement at a concentration of from 12 to about 90, preferably from about 22 to about 75 weight percent, based on the weight of the sugar solution. The sugar ingredient can be any commercially available sugar such as sucrose, glucose, lactose, maltose or fructose. The source of sucrose is the cane and beet sugar industry; of glucose, the corn starch industry; and of lactose, the dairy industry. Maltose is available in malt syrup and fructose is available as a by-product of the dextran industry or from invert sugar. Preferably, aqueous solutions containing from 10 to about 90 weight percent, preferably from 12 to about 60 weight percent, sugars, are used. This concentration range includes most commercially available sugar-containing by-products of various industries.

The sugar industry produces large quantities of molasses which can be used directly. Molasses is commercially available as an aqueous solution having a sugar content from about 60 to 85 Brix, and a consistency varying from a thin to a thick syrup. The molasses can be any sugar-containing molasses such as cane or blackstrap molasses, beet molasses, converted molasses, wood sugar molasses, hydrosyrup, citrus molasses and the like. Molasses of a concentration of from 65 to about 85 Brix is preferred. By-products of the molasses and sugar industry can also be used such as Steffens filtrate, a sugar containing by-product obtained from beet molasses. Another sugar industry by-product in Myces, which is the residue after separation of yeast cells grown in a molasses culture medium.

Another by-product useful herein as a sugar ingredient is starch molasses which is a by-product of dextrose manufacture from corn or grain sorghums by acid or enzymatic hydrolysis. It contains greater than about 40 weight reducing sugar and greater than about 50 weight percent total sugar, (sugars calculated as dextrose).

Another sugar source is the dairy industry which produces large quantities of whey as a by-product of cheese manufacture. The whey is a dilute solution of the lactoalbumin, lactose, some of the fat, and the soluble inorganics from the parent milk. This solution is condensed and then spray dried or condensed to 40 or 50% solids and preserved. The spray dried solid is a powder which can be readily dissolved in water to form an aqueous sugar solution for use in the invention.

A typical analysis is as follows:

Table 2

| Composition of a Typical Spray Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

Modified wheys such as partially delactosed whey in which some of the lactose in the whey is selectively removed can also be used. Another modified whey is partially hydrolyzed whey in which some of the lactose is hydrolyzed (usually by lactate enzymatic hydrolysis) thereby reducing the lactose content. A reduction in the lactose content of the whey is desirable to permit use of higher solids content wheys than can be used with the unmodified whey. The typical spray dried or condensed whey is limited to a solids content of from 40 to about 60 weight percent since lactose crystallizes at ambient temperatures from wheys of higher content lactose. The aforementioned modified wheys are free of this crystallization tendency and their solids content can be from 40 to about 80 weight percent without encountering any instability. Other milk products which can be included as a sugar source include dry skimmed milk which is the residue obtained by drying of defatted milk, and condensed skim milk residue, obtained by evaporating defatted milk.

A third source of sugar is the pulp and paper industry which produces large quantities of by-product wood sugars such as lignin sulfonates from wood during the sulfite pulping process. After the separation of lignin, the acidity of the resultant solution is neutralized with an ammonium or alkali metal bisulfite or base to form the following organic salts:
  ammonium lignin sulfonate;
  sodium lignin sulfonate; and
  magnesium lignin sulfonate.

A typical analysis of a commerically available ammonium lignin sulfonate solution is as follows:

Table 3

| Typical Analysis of Ammonium Lignin Sulfonate | |
|---|---|
| Percent Solids | 50.0% |
| Specific gravity | 1.237 |
| pH, 10% solution | 3.5 |
| Wood Sugars (expressed as glucose) | 16.0% |
| Tannin content | 3.0 |
| Available ammonia | 3.0% |
| Sulfur | 6.0% |
| Ash | 1.0% |

The manufacture of pressed wood yields another sugar-containing by-product which is hemicellulose extract, a concentrated soluble material obtained from treatment of wood at elevated temperature and pressure. This by-product has a total carbohydrate content greater than about 55 weight percent and contains pentose and hexose sugars. This by-product can be used as a sugar ingredient in the method of this invention.

The corn industry yields a number of by-products which contain sugars, typically glucose, and proteins. Examples of these are corn glutin feed, hydrolyzed corn protein and condensed fermented corn extractives. These also can be used as a sugar and/or protein ingredient herein.

The aforementioned sugar solutions are solidified into solid block form by any of a plurality of methods. In the preferred method, the feed supplement is solidified by the in situ to reaction of orthophosphoric acid and calcium which is preferably supplied as lime or calcium hydroxide. The reaction can be performed by adding the individual components to the sugar solution; when lime is employed it is preferred to add the lime to the sugar solution and permit the lime sufficient time to hydrate and form the soluble calcium hydroxide in the sugar solution. Typically, this is controlled by monitoring the time and/or pH of the solution. Thus, within 5–15 minutes after the lime addition or when the pH of the mixture has reached approximately 11 to 11.5, the phosphoric acid is added. The other ingredients of the supplement such as the fat, protein source, mineral mix, vitamins, etc., can be incorporated in the sugar solution prior to or during the addition of the lime. The fat, for example, can be emulsified in the sugar solution to form a fat-in-oil emulsion and for this purpose various oil-in-water emulsifiers can be used. The amount of emulsifier employed should be that quantity just sufficient to effect the desired emulsification and can be from about 0.5 to about 5 weight percent, preferably from about 1 to about 2 weight percent based on the total weight of the composition. Examples of suitable emulsifiers include cationic emulsifiers such as fatty amines, fatty amides, quaternary alkyl and aryl ammonium salts and hydrates, etc. Suitable anionic emulsifiers include the fatty acid glyceride sulfonates and fatty acid sulfonates such as sulfonated cottonseed oil, sulfonated sperm oil, sulfonated tallow, sulfonated aromatic hydrocarbons, e.g., benzene sulfonic acid, etc. Useful nonionic compounds include polyethylene oxide condensates of hydrophobic groups having a reactive hydrogen with from 10 to about 25 carbons condensed with from 2 to about 15 molecular weights of ethylene oxide. Examples of such materials include polyoxyethylene condensate with alkyl or alkenyl amines or maides, fatty acid partial esters of hexitans, etc. Free fatty acids and phospholipids which are present in some fat sources also function as emulsifying agents and no added emulsifying agent may be required with such fat sources.

The Protein Source

Protein containing nutrients in powder form that can be added to the supplement include the following: dried blood or meat meal from rendering plants which also serve as a phosphorous source, cottonseed meal, soymeal, dehydrated alfalfa, dried and sterilized animal and poultry manure, fishmeal, powdered egg, dried fish solubles, cell cream, and rabbit pellets. The fish solubles is a dried concentrate of the cooking water from a fish cannery which has a very high protein content. Cell cream is obtained by drying dead bacterial cells used to manufacture monosodium glutamate by fermentation. The dry powder usually contains about 90 weight percent protein. Rabbit pellets is a commercially available dry, composited mixture of ground, dehydrated alfalfa and a cereal such as corn or wheat with trace minerals and vitamins.

When the feed supplement is intended for consumption by ruminants, a non-protein nitrogen compound can serve as the protein source. Ammonia compounds, e.g., urea, buiret or mono or di-ammonium phosphate can be used. The preferred material for a nitrogen source is urea which in prior supplements has been added in amounts below valves that could result in toxicity problems from overconsumption, in an amount from 2 to about 15 weight percent, preferably from about 5 to about 12 weight percent, based on the feed supplement. Since the invention prevents overconsumption, greater amounts, from 2 to 20 weight percent can be used, if desired. Since the ammonium salt gelling agent contributes non-protein nitrogen, the quantity of the ingredient added solely as a source of non-protein nitrogen is lessened in proportion to the quantity of the ammonium salt gelling agent.

The feed supplement can contain up to about 65, preferably up to about 40 weight percent equivalent protein content from a protein or non-protein nitrogen compound. When molasses is used as a sugar source, the maximum amount of urea can be reduced by the amount of nitrogen contributed by the molasses (about 1 to 3 weight percent) to the preferred, maximum 12 weight percent limit based on the feed supplement. A typical ruminant feed block would, therefore, contain from 5 to about 15, preferably from 7 to about 12 weight percent urea as a source of non-protein nitrogen.

The Fat Ingredient

A source of an animal edible fat such as the edible, water insoluble fats and oils from animal and vegetable sources can be used in preparation of the supplement. The supplement prepared by the method of the invention can contain up to about 25 weight percent, based on the supplement weight, of the edible fat. Preferably, the composition has from 3 to about 15 weight percent of the fat. These fats are various fatty acids such as stearic, palmitic, oleic, linoleic, lauric, etc., and the mono, di or tri-glycerides of these fatty acids. Useful fats and oils can also include complex lipids such as the phospholipids, e.g., fatty acid esters of glycerol phosphate or lecithins, which also contain nitrogen bases such as choline. The fats are commonly identified by source and suitable fats which can be employed include the oils, tailings or residues of the following: soybean oil, cottonseed oil, sesame oil, olive oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils. The fat ingredient can also contain an antioxidant in an effective amount to inhibit oxidative degradation of the fat, e.g., from 0.01 to about 1 weight percent butylated hydroxyanisole, butylated hydroxytoluene, 4-hydromethyl-2,6-3di-tert-butylphenol, etc.

Another method for the solidification of the feed supplement comprises the in situ formation of a calcium fatty acid soap. The fatty acids which are available for this reaction are, in general, the long chain fatty acids from animal and vegetable sources, e.g., yellow grease contains from 3 to about 15 percent free fatty acids and these are ideally suited for the reaction. Other high molecular weight fatty acids which can be used are available from other industrial products such as acidulated cottonseed oil, brown grease and the like. Typically, these acids have from 12 to about 18 carbons and are saturated and monoethylenically unsaturated fatty acids.

The source of the fatty acid is preferably yellow grease and this material is employed also as the animal edible fat source. The material is incorporated in the sugar solution preferably by mixing in the presence of a suitable oil-in-water emulsifier of the identity and concentrations previously described. The other ingredients can be mixed into the resulting emulsion and thereafter the calcium precipitant can be added. It is preferred in this application to have an alkaline pH in the product since the alkaline pH conditions are conducive to proper soap formation. Accordingly, a sufficient quantity of calcium oxide or calcium hydroxide is added to the sugar-fat emulsion to raise the pH of the mixture to a value above about 7, preferably from about 8 to about 9. At these conditions, the material will solidify within a period of time from 1 to about 24 hours.

Another method for the solidification of the supplement is to concentrate the sugar solution to crystallize the sugars therefrom. This method is practiced by heating of the sugar solution to a temperature from about 220° to about 300° F. and at a subatmospheric pressure from about 25 to about 27 inches vacuum. The heating is conducted sufficiently to substantially reduce the water content of the supplement so that the sugar in the supplement will cause it to harden into a brittle, glass-like solid. The sugar solution can be heated in the presence of the other additives such as the fat, protein source, etc. Preferably, however, the sugar solution is heated separately and the ingredients are mixed with the concentrated sugar solution after heating.

The following examples will illustrate the preferred practice of the invention and demonstrate the results obtainable thereby:

EXAMPLE 1

The ingredients set forth in the following table are employed in the quantities indicated in parts by weight to prepare a feed supplement useful for horses.

Table 4

| Ingredient | Parts |
| --- | --- |
| Cane Molasses, 79 Brix | 2,826 |
| Lime | 104 |
| Trace Mineral Mix | 40 |
| Vitamin Mix | 20 |

Table 4-continued

| Ingredient | Parts |
| --- | --- |
| Potassium Sorbate | 8 |
| 75% Ortho-Phosphoric Acid | 192 |
| Soybean Meal (42% Protein) | 400 |
| Soy Oil | 400 |
| Total | 3,990 |

The ingredients set forth in the preceding table are admixed in the following procedure. The lime is added to 1500 parts of the molasses while agitating the ingredients in a mixing tank. Upon the addition of the lime, the temperature and the pH of the mixture rises. When the temperature reaches 98° F., the remainder of the molasses is added and the agitation is continued until the pH of the mixture reaches a value of 9.7, the temperature at this time is 90° F. The acid, vitamins and trace minerals identified in the preceding table are then added and the agitation is continued for two minutes until the initially formed acid gel is broken. The soy oil and soybean meal are then added and stirring is continued for a period of five minutes. The resultant mixture is packaged into boxes in 40 pound quantities. At the time of packaging, the temperature of the mixture is 102° F.

Dividers of the type illustrated in FIG. 1, subdividing the box into 30 compartments, are placed into each box, the boxes are closed and placed on pallets, with 50 boxes per pallet. The boxes are stored in a warehouse overnight to set and are inspected the following day and the product is observed to have a hardness value of 78 using a modified durameter test meter.

EXAMPLE 2

A block of feed supplement useful for supplementing the diet of dairy cattle was prepared using the ingredients set forth in the following table:

Table 5

| Ingredient | Parts |
| --- | --- |
| Cane Molasses, 79 Brix | 1,530 |
| Monoammonium phosphate (Monofos) | 400 |
| Trace Mineral Mix | 4 |
| Calcium Chloride, Flake 80% | 60 |
| Vitamins A, D and E | 6 |
| Total | 2,000 |

The feed supplement is prepared by adding the monoammonium phosphate and molasses to the tank and stirring the mixture for 15 minutes. The trace minerals and calcium chloride are added and the mixture is stirred for five minutes, the vitamins are added and the mixture is stirred for 10 additional minutes. The temperature of the mixture is 88° F. The mixture is packaged in corregated cardboard boxes in net quantities of 45 pounds per box and a partition of the type shown in FIG. 1, subdividing the box into 30 compartments is inserted in each of the boxes. The boxes are closed, placed on pallets and stored in a warehouse. The product reaches a hardness value of 80 on a modified durameter scale by the following morning.

EXAMPLE 3

A feed supplement useful for free choice feeding of range cattle and containing a growth promoting drug is prepared with the ingredients identified in the following table:

Table 6

| Ingredient | Parts |
| --- | --- |
| Cane Molasses, 79 Brix | 2,582 |
| Lime | 78 |
| Urea | 195 |
| 70% Phosphoric Acid | 189 |
| Trace Mineral Mix | 6 |
| Vitamin A | 0.4 |
| Vitamin D | 0.1 |
| Vitamin E | 0.2 |
| Rumensin | 10.5 |
| Total | 3,061.2 |

The feed supplement is prepared by admixing the lime with 2532 parts of the cane molasses and stirring the mixture for 27 minutes whereupon the temperature and pH rose to values of 90° F. and 9.6, respectively. The urea is added and the stirring is continued for 6 minutes, the resultant mixture has a temperature of 80° F. and a pH of 9.7. The acid, trace minerals and vitamins are then added and the mixture is stirred for 3 minutes. The pH of the mixture is 4.0 and its temperature is 92° F. The growth promoting drug, Rumensin, is admixed with the remaining 50 pounds of the molasses and added to the mixture which is stirred for 10 minutes and then packaged in corregated cardboard boxes in net quantities of 45 pounds per box. A partition shown in FIG. 1 is placed in each box with the spacing to provide 30 compartments per box. The boxes are closed and placed on pallets and stored in a warehouse.

EXAMPLE 4

A feed lot test is conducted to determine the relative consumption rates on a feed supplement containing the structural members (cardboard partitions) of the invention and feed blocks containing none of these members. The feed test is conducted with 53 head of feed lot cattle. The cattle are permitted free-choice feeding of the feed supplement of the composition set forth in Example 3 in plain corregated cardboard boxes having no structural members and the corregated cardboard boxes containing corregated cardboard partitions of the type described in Example 3. During the initial two weeks of the test, there is a low consumption of both supplements as a result of an adjustment of the animals to the feed lot environment. At the end of the third week, however, it is observed that the average consumption of all supplements was 0.83 pounds per head per day and after the fourth week the consumption rate has risen to 1.35 pounds per head per day. The cattle, however, eat twice the amount of the boxes containing no structural members and, accordingly, the consumption rates for the supplements with the structural members is 0.27 and 0.45 pound per head per day, whereas the consumption rate for the supplements containing no structural members is 0.56 and 0.90 pound per head per day, for the two weeks of the test observation.

The preceding Example clearly demonstrates a significant decrease in rate of consumption of the feed supplements which contain the structural members of the invention.

The invention has been described with reference to the exemplified and presently preferred embodiment. It is not intended that the invention be unduly limited by this disclosure of a specific and preferred embodiment. Instead, it is intended that the invention be defined by the method steps and reagents, and their obvious equivalents, set forth in the following claims.

What is claimed is:

1. An animal feed supplement in the form of a solid block comprising from 12 to about 95 weight percent of a sugar solution with optional ingredients comprising up to about 25 weight percent fat, and up to about 40 weight percent of a protein source and 1 to about 5 weight percent of each of calcium and phosphorus added thereto as calcium oxide and phosphoric acid to cause said supplement to solidify into solid block form packaged in an animal edible paper carton and having disposed therein a sufficient number of animal edible vertical cardboard partitions extending through the solid block to physically interfere with and substantially reduce the consumption thereof by animals.

2. The feed supplement of claim 1 wherein said partitions have a plurality of apertures, interconnecting said vertical cells.

3. The animal feed supplement of claim 1 containing from 3 to about 15 weight percent fat.

4. The animal feed supplement of claim 1 containing from 20 to about 40 weight percent protein.

5. The animal feed supplement of claim 1 wherein both said carton and partitions are formed of cardboard.

6. A method for the manufacture of an animal feed supplement in solid block form having a reduced animal consumption rate which comprises preparing a liquid, solidifiable composition of from 12 to about 95 weight percent of a sugar-containing solution and up to about 40 weight percent of a protein material and calcium oxide and phosphoric acid in amounts from 1 to 5 weight percent each of calcium and phosphorous sufficient to cause solidification of said sugar solution filling a paper carton with the liquid composition, inserting into the carton a plurality of animal edible vertical cardboard partitions extending throughout the bulk of the supplement within the carton and permitting the composition to solidify into solid block form containing the plurality of vertical cardboard partitions.

7. The method of claim 6 wherein said calcium oxide is added to said sugar solution and permitted to hydrate to calcium hydroxide and is thereafter neutralized by the addition thereto of phosphoric acid.

8. The method of claim 7 including the steps of adding to the composition from 3 to 15 weight percent fat.

9. The method of claim 6 including the step of adding from 20 to 40 weight percent of protein to said supplement.

10. The method of claim 6 wherein both said container and partitions are formed of cardboard.

* * * * *